(12) United States Patent
Golden et al.

(10) Patent No.: US 7,452,407 B2
(45) Date of Patent: Nov. 18, 2008

(54) PRODUCTION OF CARBON MONOXIDE-FREE HYDROGEN AND HELIUM FROM A HIGH-PURITY SOURCE

(75) Inventors: Timothy Christopher Golden, Allentown, PA (US); Thomas Stephen Farris, Bethlehem, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 439 days.

(21) Appl. No.: 11/365,780

(22) Filed: Feb. 28, 2006

(65) Prior Publication Data

US 2007/0199446 A1   Aug. 30, 2007

(51) Int. Cl.
*C01B 3/56* (2006.01)
*C01B 23/00* (2006.01)

(52) U.S. Cl. .................... 95/97; 95/98; 95/102; 95/140
(58) Field of Classification Search ............... 95/95–98, 95/102, 104, 105, 140, 148; 423/247
See application file for complete search history.

(56) References Cited

U.S. PATENT DOCUMENTS

| | | | |
|---|---|---|---|
| 4,171,206 A | 10/1979 | Sircar | |
| 4,477,267 A | 10/1984 | Reiss | |
| 4,957,514 A | 9/1990 | Golden et al. | |
| 5,604,047 A | 2/1997 | Bellows et al. | |
| 5,955,214 A | 9/1999 | Bellows et al. | |
| 6,083,301 A | 7/2000 | Gary et al. | |
| 2002/0110504 A1 | 8/2002 | Gittleman et al. | |
| 2005/0257685 A1 | 11/2005 | Baksh et al. | |
| 2006/0210454 A1* | 9/2006 | Saxena et al. | ............... 422/169 |

FOREIGN PATENT DOCUMENTS

| | | |
|---|---|---|
| EP | 1 097 902 A1 | 5/2001 |
| EP | 1 097 902 A2 | 5/2001 |

* cited by examiner

*Primary Examiner*—Frank M Lawrence
(74) *Attorney, Agent, or Firm*—Keith D. Gourley

(57) ABSTRACT

The invention provides vacuum swing adsorption processes that produce an essentially carbon monoxide-free hydrogen or helium gas stream from, respectively, a high-purity (e.g., pipeline grade) hydrogen or helium gas stream using one or two adsorber beds. By using physical adsorbents with high heats of nitrogen adsorption, intermediate heats of carbon monoxide adsorption, and low heats of hydrogen and helium adsorption, and by using vacuum purging and high feed stream pressures (e.g., pressures of as high as around 1,000 bar), pipeline grade hydrogen or helium can purified to produce essentially carbon monoxide-free hydrogen and helium, or carbon monoxide, nitrogen, and methane-free hydrogen and helium.

36 Claims, 3 Drawing Sheets

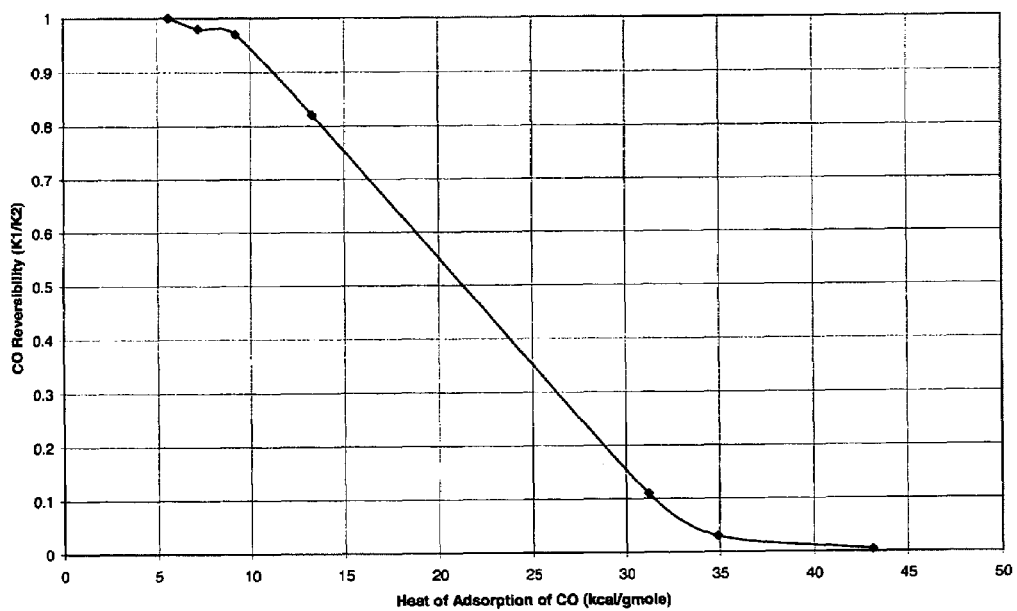
Figure 1. Heat of CO adsorption vs K1 CO/K2 CO

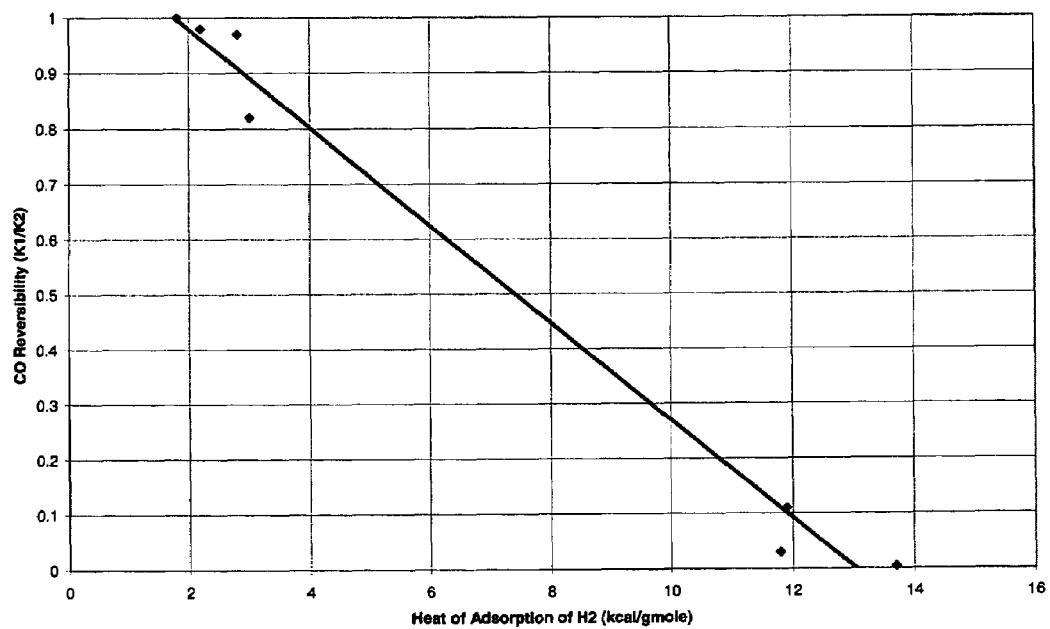
Figure 2. Heat of H2 Adsorption vs CO Reversibility

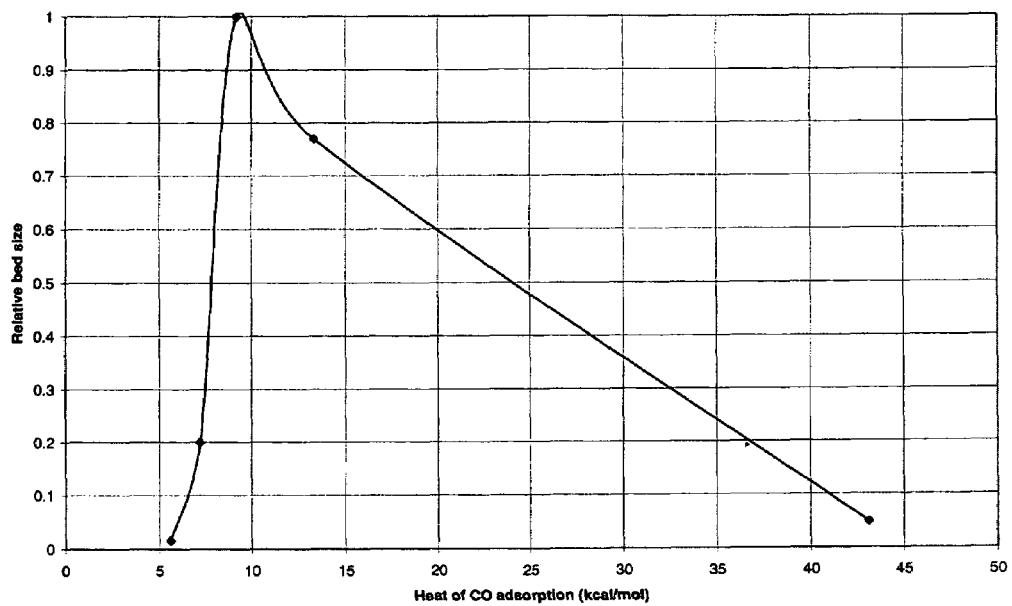
Figure 3. Relative bed size for trace CO removal vs heat of CO adsorption

PRODUCTION OF CARBON MONOXIDE-FREE HYDROGEN AND HELIUM FROM A HIGH-PURITY SOURCE

STATEMENT REGARDING FEDERALLY SPONSORED RESEARCH OR DEVELOPMENT

This invention was made with Government support under DOE Cooperative Agreement No. DE-FC36-05G085026 between Air Products and Chemicals, Inc., and the United States Department of Energy. The Government has certain rights to this invention.

BACKGROUND OF THE INVENTION

The "Hydrogen Economy" is expected to grow continuously and hydrogen may eventually supplant fossil fuels as a primary energy source for many applications. Numerous hydrogen applications are being developed, including hydrogen-powered fuel cell or internal combustion vehicles, stationary power applications, backup power units, power grid management, power for remote locations, and portable power applications in consumer electronics, business machinery, and recreational equipment. A significant expansion of the Hydrogen Economy will require marked improvements in hydrogen purification techniques.

Because of their short useful life, polymer exchange membrane (PEM) fuel cells do not yet offer a commercially viable alternative to traditional power sources. The short lifespan of PEM fuel cells is attributable in part to membrane poisoning caused by the reaction of carbon monoxide found in a typical hydrogen gas stream with noble metals found in PEM's. In certain modes of fuel cell operation (e.g., running the fuel cell "dead ended"), the concentration of non-reactive trace impurities like nitrogen and methane can increase and the fuel cell requires periodic purging to remove the impurities. Thus, the more pure the hydrogen stream, the more reliable and efficient the fuel cell Since pipeline-grade hydrogen usually contains 1-10 parts per million (ppm) carbon monoxide, PEM fuel cells will be poisoned eventually by the carbon monoxide in a pipeline-grade hydrogen stream.

U.S. Pat. No. 4,477,267 ("'267 Patent") describes hydrogen purification pressure swing adsorption ("PSA") processes that use Ca-zeolite X granulate as an adsorbent. The PSA processes of the '267 Patent do not disclose the use of vacuum recovery of adsorbent, operate at low feed pressures, and achieve hydrogen recovery in the range of around 82%.

U.S. Patent Application Document No. US 20050257685 discloses the use of a continuous feed supply gas in a multiple bed PSA system, preferably a three bed hydrogen PSA system, that utilizes shorter beds having a lower adsorption pressure with an optimum ratio of product pressurization to adsorption pressure ranges from about 0.20 to about 0.35 for adsorption pressure from 20 psig to 900 psig from a 12-step cycle and 50 psig to 900 psig for other cycle steps.

U.S. Patent Application Document No. US 20020110504 discloses an apparatus for removing carbon monoxide from a hydrogen-rich gas stream. In one aspect, the hydrogen-rich stream is produced in a hydrogen fuel cell system which further includes membrane electrode assemblies where such hydrogen is reacted with oxygen to produce electricity.

U.S. Pat. No. 5,604,047 discloses methods for lowering the carbon monoxide content of a CO-containing, hydrogen-rich gas stream by contacting the gas stream with an adsorbent capable of preferentially adsorbing the carbon monoxide in the gas stream, the adsorbent being selected from the group consisting of platinum, palladium, ruthenium, rhenium, iridium, the carbides and nitrides of tungsten, molybdenum, vanadium, chromium, tantalum and mixtures thereof.

U.S. Pat. No. 5,955,214 discloses methods for lowering the carbon monoxide content of a CO-containing, hydrogen rich gas stream by contacting the gas stream with a scavenger capable of preferentially oxidizing the carbon monoxide in the gas stream and then regenerating the scavenger, the scavenger being selected from the group consisting of mixed oxides of manganese and copper; mixed oxides of manganese and copper in combination with mixed oxides of silver, nickel, iron and tin; mixed oxides of tin and copper; $SnO_2$—CuO gels; and mixtures thereof.

There is a continuing need for improved and commercially practicable hydrogen and helium purification processes that can generate essentially carbon monoxide-free hydrogen and helium from, respectively, pipeline hydrogen and helium. Such hydrogen purification processes would make pipeline hydrogen a viable energy resource for PEM fuel cells, and in turn would increase the use of such fuel cells.

BRIEF SUMMARY OF THE INVENTION

The invention provides vacuum swing adsorption processes that produce an essentially carbon monoxide-free hydrogen or helium gas stream from, respectively, a high-purity (e.g., pipeline grade) hydrogen or helium gas stream using one or two adsorber beds.

By using physical adsorbents with high heats of nitrogen adsorption, intermediate heats of carbon monoxide adsorption, and low heats of hydrogen adsorption, and by using vacuum purging and high feed stream pressures (e.g., feed pressures of as high as around 1,000 bar) and feed times of greater than around 30 minutes, pipeline grade hydrogen can be purified to produce essentially carbon monoxide-free hydrogen or carbon monoxide, nitrogen, and methane-free hydrogen.

Also, by using physical adsorbents with high heats of nitrogen adsorption, intermediate heats of carbon monoxide adsorption, and low heats of helium adsorption, and by using vacuum purging and high feed stream pressures (e.g., feed pressures of as high as around 1,000 bar) and feed times of greater than around 30 minutes, pipeline grade helium can be purified to produce essentially carbon monoxide-free helium or carbon monoxide, nitrogen, and methane-free helium. These adsorption systems can also remove other trace impurities present in the feed hydrogen or helium including water, carbon dioxide, oxygen and argon.

Adsorbents used in processes of the invention can be periodically regenerated by purging and evacuation at sub-atmospheric pressures (e.g., pressures of between around 0.00001 bar to around 0.5 bar).

In one embodiment, the invention provides a process for generating an essentially carbon monoxide-free hydrogen or helium gas stream, the process comprising:

(a) (i) feeding a high-purity hydrogen or helium gas feed stream for a period of around 30 minutes or greater through a first of two adsorbers that are fluidly connected in parallel or in series and that are each packed with an adsorbent consisting of a zeolite which is cation exchanged with a metal other than a transition metal and which contains less than about 0.5% by weight of a transition metal, and (ii) depending on whether high-purity hydrogen or helium gas has been fed to the first adsorber, recovering either a first essentially carbon monoxide-free hydrogen stream or helium gas stream from the first adsorber;

(b) thereafter purging the first adsorber by (1) depressurizing it to less than atmospheric pressure, and by (2) (i) recycling a portion of the first essentially carbon monoxide-free hydrogen or helium gas stream through the first adsorber, and/or (ii) feeding an inert gas stream through the first adsorber; and (c) as the first adsorber is purged, feeding a second portion of the high-purity hydrogen or helium gas feed stream for a period of around 30 minutes or greater through the second of the two adsorbers and recovering a second essentially carbon monoxide-free hydrogen or helium gas stream from the second adsorber.

Preferably, the high-purity hydrogen or helium gas feed streams are fed to the first adsorber at a pressure of between about 30 to about 1,000 bar.

In another embodiment, the invention provides a process for generating an essentially carbon monoxide-free hydrogen or helium gas stream, the process comprising:

(a) (i) feeding a high-purity hydrogen or helium gas feed stream for a period of around 30 minutes or greater through an adsorber that is packed with an adsorbent consisting of a zeolite which is cation exchanged with a metal other than a transition metal and which contains less than about 0.5% by weight of a transition metal, and (ii) depending on whether high-purity hydrogen or helium gas has been fed to the first adsorber, recovering an essentially carbon monoxide-free hydrogen or helium gas stream from the adsorber; and (b) thereafter purging the adsorber by (1) depressurizing it to less than atmospheric pressure, and by (2) (i) recycling a portion of the essentially carbon monoxide-free hydrogen or helium gas stream through the adsorber, and/or (ii) feeding an inert gas stream through the first adsorber.

Preferably, the high-purity hydrogen or helium gas feed streams are fed to the adsorber at a pressure of between about 30 to about 1,000 bar in the single adsorber bed embodiment described above.

Adsorbents used in processes of the invention have a high heat of nitrogen adsorption, an intermediate heat of carbon monoxide adsorption, and a low heat of hydrogen and helium adsorption. CaLSX is a particularly preferred example of an adsorbent that can be used in processes of the invention.

In a preferred embodiment, processes of the invention use an adsorbent consisting of a zeolite: (1) that is cation exchanged with a metal other than a transition metal; (2) that contains less than about 0.5% by weight of a transition metal; and (3) that has a heat of hydrogen and helium adsorption of less than about 5 kcal/mole, a heat of carbon monoxide adsorption of between about 8 to about 12 kcal/mole, and a heat of nitrogen adsorption of greater than about 5 kcal/mole.

In preferred embodiments, feed temperatures for processes of the invention range from around −50° C. to around 50° C.

In one embodiment, processes of the invention can use feed pressures that range from around 30 to around 1,000 bar and can use regeneration pressures that vary from around 0.00001 bar to around 0.5 bar.

Adsorbents used in processes of the invention can be regenerated rapidly by evacuation and purging (e.g., within around 10 to 30 minutes) since removed impurities are relatively weakly adsorbed. In one example, a recycle stream of essentially carbon monoxide-free hydrogen is used to purge the system by simple evacuation at sub-atmospheric pressure. Further, since the amount of purge gas required is very small compared to the volume of gas treated, very high hydrogen recoveries (e.g., greater than around 99.5%) are obtained. Advantageously, processes of the invention do not require the equipment and energy needed for thermal regeneration and can operate over extended periods of time (e.g., around four hours).

Processes of the invention can be used to produce a hydrogen or helium gas stream that is essentially free of all impurities (i.e., contains less than 1 ppb total impurities). Since nitrogen is among the first impurities to break through an adsorption bed, processes of the invention can be used to produce a nitrogen-reduced hydrogen or helium gas stream that is essentially free of carbon monoxide and methane. Processes of the invention can also be used to produce a carbon monoxide and methane-reduced hydrogen or helium gas stream.

These and other aspects of the invention are disclosed further in the following detailed description.

BRIEF DESCRIPTION OF SEVERAL VIEWS OF THE DRAWINGS

FIG. 1 is a graph of heat of carbon monoxide adsorption versus carbon monoxide Henry's Law constants, as determined in accordance with the experiment of Example 1.

FIG. 2 is a graph of heat of hydrogen adsorption versus carbon monoxide reversibility, as determined in accordance with the experiment of Example 1.

FIG. 3 is a graph of relative bed size for trace carbon monoxide removal versus heat of carbon monoxide adsorption, as determined in accordance with the experiment of Example 7.

DETAILED DESCRIPTION OF THE INVENTION

The following definitions apply unless indicated otherwise.

A "high-purity hydrogen gas stream" is a hydrogen gas stream which contains around 99.9% by volume hydrogen on a dry basis (i.e., excluding water) and which can contain as much as around 1,000 ppm of non-hydrogen impurities.

A "high-purity helium gas stream" is a helium gas stream which contains around 99.9% by volume helium on a dry basis (i.e., excluding water) and which can contain as much as around 1,000 ppm of non-helium impurities.

An "essentially carbon monoxide-free hydrogen gas stream" or an "essentially carbon monoxide-free helium gas stream" is a hydrogen or helium gas stream which contains less than about 1 ppm carbon monoxide. An essentially carbon monoxide-free hydrogen or helium gas stream, while containing less than about 1 ppm carbon monoxide, can include impurities such as methane (e.g., around 500 ppm methane) and nitrogen (e.g., around 1,000 ppm nitrogen). In certain embodiments, processes of the invention can be used to make an essentially carbon monoxide-free hydrogen or helium gas stream containing around 1-10 ppb total impurities.

Table 1 illustrates how, in certain embodiments, processes of the invention can generate a hydrogen feed stream comprising 10 ppm carbon monoxide, 500 ppm methane, and 1,000 ppm nitrogen. The relative feed time is the required on-line time for a given bed volume and feed flow rate to reach the product purity listed. For example, at a relative feed time of 1.0, a hydrogen stream with 100 ppb total impurity (nitrogen) can be produced. If the feed time is increased by a factor of 10, a CO-free (100 ppb) hydrogen stream can be produced with feed concentrations of methane (500 ppm) and nitrogen (1,000 ppm).

TABLE 1

| Relative feed time | Product Purity |
|---|---|
| 1 | 100 ppb total impurity (nitrogen) (99.99999% hydrogen) |
| 3 | 1,000 ppm nitrogen (99.9% hydrogen) |
| 10 | 1,000 ppm nitrogen and 500 ppm methane (99.85% hydrogen) |

A "non-hydrogen impurity" is any ionic or molecular species or specie other than hydrogen.

A "non-helium impurity" is any ionic or molecular species or specie other than helium.

Zeolites contain a lattice silica and optionally alumina in combination with an exchangeable cation such as an alkali or alkaline earth metal ion. Various oxides may replace the silica and alumina zeolite components; e.g., germanium oxide, tin oxide, phosphorous oxide, and mixtures thereof can replace the silica portion. Boron oxide, iron oxide, gallium oxide, indium oxide, and mixtures thereof can replace the alumina portion. Zeolites that can be used to make adsorbents used in processes of the invention include but are not limited to zeolites A, X, low silica X (LSX), Y, mordenite, chabazite, erionite, offretite, and clinoptilite. Zeolites used in processes of the invention can be in binderless form.

A zeolite that is "cation exchanged with a metal other than a transition metal" is a zeolite in which a constituent metal is replaced through techniques well-known to those of ordinary skill in the art with a cationic metal other than a metal of Groups III-XII of the Periodic Table. Preferably, the zeolite is cation exchanged with an alkaline earth metal (i.e., a metal from Group II of the Periodic Table). Most preferably, the zeolite is cation exchanged with calcium. Typical cation-exchange techniques involve contacting a zeolite with a solution containing a salt of the desired replacing cation or cations. Although a wide variety of salts can be employed, chlorides and other halides, acetates, nitrates, and sulfates are particularly preferred. The zeolite is usually calcined prior to the cation-exchange procedure to remove the organic matter present in the channels and on the surface, which results in a more effective cation exchange.

Preferred adsorbents used in processes of the invention can be made from a LSX zeolite (either powder or formed particles), which originally has sodium or potassium ions as the charge-compensating cation. The formed particles can contain clay or another binder or they may be binderless. Preferred LSX zeolites should have Si/Al ratio of equal to or less than around 1.2. This material is then hydrated to a water content of about 15% by weight or greater. In preparing the zeolite, cations are exchanged sequentially. First, the sodium or potassium ions, as the case may be, are replaced by calcium cations. Typically, this is effected by contacting the zeolite with an aqueous solution of a calcium salt, e.g., calcium chloride, calcium nitrate, or calcium acetate using known methods. Substantially all of the sodium or potassium ions are replaced to a level of greater than around 50%, preferably greater than around 70% of exchangeable calcium cations, using various contacting methods which are known in the art. Some of the original cations remain.

An as-received zeolite typically meets a specification of less than 1% by weight residual water. However, prior to being loaded into the adsorbent vessel, a zeolite may have a residual water loading of greater than around 1% by weight as a result of water adsorption during storage. In such circumstances, residual water may be removed from the zeolite prior to the adsorption step by heating the zeolite with an inert gas stream at a temperature of around 250° to around 400° C.

For example, once the appropriate level of cation exchange is achieved, the material is dried to reduce the water concentration to around 10% by weight or less. Drying can be accomplished in an oven which is swept preferably with dry, $CO_2$-free air. Heating may be continuous in a slow ramp or by stages, up to a temperature of around 250° C., where the sample is held for around 2 to several hours until the water concentration is around 10% by weight or less. The adsorbent is then calcined at around 350° C. to around 400° C. to reduce its water concentration to around 1% by weight or less.

A "zeolite which is not cation exchanged" means a zeolite in which a constituent metal has not been exchanged with a cationic metal other than a metal of Groups III-XII of the Periodic Table.

"Selectivity" is defined generically as the degree of adsorption of one component relative to the degree of adsorption of another component on a given adsorbent. Selectivity of a first component over a second component is defined specifically herein as the ratio of the Henry's Law constant of the first component to the Henry's Law constant of the second component, where the Henry's Law constants are determined from the respective adsorption isotherms at 30° C. and 70° C.

The Henry's Law constant is defined as the initial slope of the pure gas adsorption isotherm at low adsorbate loading, where the isotherm is linear. Zeolites that are cation exchanged with a metal other than a transition metal as defined herein are characterized in that they have a Henry's Law constant ratio for carbon monoxide/hydrogen or helium at 30° C. (also called carbon monoxide/hydrogen or helium selectivity) of at least around 100, a Henry's Law constant ratio for nitrogen/hydrogen or helium at 30° C. (also called nitrogen/hydrogen or helium selectivity), of at least around 10, and a Henry's Law constant ratio for methane/hydrogen or helium at 30° C. (also called methane/hydrogen or helium selectivity), of at least around 30.

Adsorbent particles used in processes of the invention can be in the shape of beads, extrudates, or can be irregular shapes which result from crushing and sieving. The average particle size of an adsorbent material in the form of beads or irregular shapes is defined as the weighted mean of the particle size distribution as determined by standard methods known in the art. One method is fractionating the adsorbent particles through a series of standard sieve screens as described in the Chemical Engineers' Handbook, Fifth Edition, by R. H. Perry and C. H. Chilton, Section 21, Screening. The average particle diameter of extrudates can be calculated by methods given in the Chemical Engineers' Handbook, Fifth Edition, by R. H. Perry and C. H. Chilton, Section 5, Beds of Solids. Adsorbent particle size can range from around 0.5 mm to around 5 mm.

Known adsorbents and getters (particularly adsorbents and getters used in carbon monoxide removal) have used transition metal-based adsorbents; transition metal-based adsorbents do not remove impurities effectively from a bulk hydrogen stream due to hydrogen chemisorption. If a material chemisorbs hydrogen, its ability to adsorb impurities is reduced and additional impurities may be generated. For example, if a material chemisorbs hydrogen, un-adsorbed carbon monoxide may react with hydrogen to produce methane and water.

Adsorbents used in processes of the invention are characterized by:
(1) low heats of hydrogen and helium adsorption (i.e., less than about 5 kcal/mole) that correlate with reduced hydrogen and helium chemisorption (e.g., chemisorption of hydrogen is characterized by a high heat of adsorption (e.g., greater than about 8-10 kcal/mole));

(2) intermediate heats of carbon monoxide adsorption (i.e., between about 8 to about 12 kcal/mole); and (3) high heats of nitrogen adsorption (i.e., heats of nitrogen adsorption of greater than around 5 kcal/mole). Adsorbents with high Henry's law constants (e.g., 1 mmole/g/atm or greater at 30° C.) for nitrogen are preferred to facilitate removal of nitrogen and methane impurities from high-purity hydrogen and helium streams using processes of the invention.

"Noble metals" include include gold, silver, tantalum, platinum, and palladium.

"Capacity" (as in "capacity of physical adsorbents") means the loading of the gas impurity in weight percent or moles/g at a given impurity partial pressure and temperature.

Well-known infrastructure (e.g., pipes, valves, compressors, etc.) can be used to fluidly connect adsorbers, a high-purity hydrogen or helium gas stream, and an optional non-hydrogen or helium gas purge stream to purify the high-purity hydrogen or helium gas stream and regenerate adsorbents in accordance with the invention. For example, multiple directional valve configurations known in the art (e.g. as used in VSA or PSA systems) may be used to control gas flows to and from adsorbers. Adsorbers can be configured and packed with adsorbents in any variety of ways that are well known to those of ordinary skill in the art. Processes of the invention can use radial and axial adsorbers, or combinations of radial and axial adsorbers, that fluidly connected in parallel and/or in series and that are packed with one or more adsorbents as defined herein.

"Control means" can be associated, e.g., with the adsorbers and high-purity hydrogen or helium gas stream used in processes of the invention. The control means can perform a variety of functions, including regulating the flow rate of the high-purity hydrogen or helium gas stream to one or both adsorbers.

"Hydrogen distribution system" includes any system suitable for the transmission of an essentially carbon monoxide-free hydrogen gas stream to a hydrogen consumer. A hydrogen distribution system can transmit an essentially carbon monoxide-free hydrogen gas stream to a variety of types of hydrogen consumers (including stationary e.g., residential and industrial) consumers and vehicular consumers (e.g., operators of FCV's, planes, or ships) through a network of interconnected pipelines and compressors, and if necessary, storage facilities. A hydrogen distribution system could also include a vehicular (e.g., truck or train) distribution system. For example, a hydrogen distribution system can: (1) include a hydrogen fueling station, including but not limited to a hydrogen fuel station for vehicles, e.g., as described in U.S. Pat. No. 6,810,925; (2) provide an essentially carbon monoxide-free hydrogen gas stream which is delivered at a controlled rate of delivery to receiving tanks of various sizes, e.g., in accordance with the invention described in U.S. Pat. No. 6,786,245; or (3) provide an essentially carbon monoxide-free hydrogen gas stream to: (a) an industrial gas application, (b) a stationary fuel cell, and (c) to a transportation application (e.g., an airport or a distribution center that uses forklifts or other vehicles powered in whole or in part by hydrogen).

In one embodiment of the invention, a high-purity hydrogen gas stream at a temperature of between about −50° C. to around 50° C. is purified at pressures of between about 30 to about 1,000 bar using an adsorber that is packed with adsorbent particles consisting of a zeolite which is cation exchanged with a metal other than a transition metal and which contains less than about 0.5% by weight of a transition metal. The adsorber can also be packed with one or more less-adsorbent materials, e.g., carbon, alumina, silica gel, or a zeolite which is not cation exchanged.

Hydrogen purification processes of the invention can be implemented at a hydrogen delivery station, a hydrogen storage station, in a hydrogen storage vessel, or at the point of use (e.g. on a car).

In a preferred embodiment of a process of the invention, only one bed of adsorbent is used. Since the regeneration process can be accomplished quickly, the adsorber can be regenerated, e.g., while hydrogen is not being delivered to a vehicle or fuel cell. However, as described above, two-bed systems can also be employed in which one bed purifies a high purity hydrogen or helium gas stream while the other bed is regenerated.

The invention is illustrated further in the following non-limiting examples.

EXAMPLES

Materials and Methods

The AgLiX zeolite used in the experiments of Examples 1-4 was a 20% Ag/80% LiX zeolite produced in accordance with U.S. Pat. No. 6,432,170. The material was obtained from Zeochem, Louisville, Ky., USA.

The CaX zeolite used in the experiments of Examples 1, 2, and 5-7 was a CECA (Paris, France) zeolite designated as G586 (86% calcium exchanged).

The 13X zeolite used in Examples 1 and 2 was a UOP zeolite (Des Plaines, Ill.) designated as APG grade.

The Pd/Pt on alumina used in the experiments of Examples 1 and 2 was a Heraeus (Hanau, Germany) catalyst designated as K-0288.

The CuCl/alumina zeolite used in the experiments of Examples 1 and 2 was produced in accordance with U.S. Pat. No. 5,175,137.

The CuCl/zeolite zeolite used in the experiments of Examples 1 and 2 was produced in accordance with U.S. Pat. No. 4,917,711.

The Ni/alumina used in the experiments of Examples 1 and 2 was an Engelhard (Iselin, N.J.) getter designated as Ni3298.

Except for Examples 3 and 5b (which involved helium carrier gas streams), the experiments of the examples involved hydrogen carrier gas streams.

Example 1

Conclusions

Based on the experiments of this example, it was concluded that: (1) materials that chemisorb $H_2$ and CO are not suitable for use as adsorbents in processes of the invention; and (2) low heats of CO adsorption are required for rapid adsorbent reactivation by simple evacuation in accordance with the invention.

Adsorption of CO and $H_2$

The adsorption of CO and $H_2$ was measured on a variety of adsorbents in a standard volumetric adsorption unit. Isotherms were measured at both 30° C. and 70° C. so that heats of adsorption could be determined by the Clausius-Clayperon equation. Henry's law constants (initial isotherm slopes, K H) were also determined in this way. Henry's law constants were determined at an equilibrium pressure of 0.001 atm or lower. All adsorption heats reported were determined at a gas loading of 0.1 mmole/g.

Initially, the adsorbents were activated in flowing $N_2$ at 150° C. Between each isotherm, the adsorbent was reactivated unless otherwise noted. CO adsorption isotherms were measured at 30° C. and 70° C. so that heats of CO adsorption could be determined. Then $H_2$ isotherms were also measured at 30° C. and 70° C. so that heats of $H_2$ adsorption could be determined. The adsorbent was then reactivated at 150° C. and exposed to $H_2$ at 30° C., 10 atm for 45 minutes. The sample was then evacuated to $10^{-1}$ torr for 2 hours. Then a CO adsorption isotherm was measured again at 30° C.

If the adsorption of $H_2$ affected the CO capacity, one should see a drop in the CO capacity on the next CO adsorption measurement. Table 2 below gives the results of this testing for a variety of adsorbents. The Henry's law constants listed in Table 2 were measured at 30° C.

around 0.5 bar). The regeneration process should be completed quickly; there is no need for supplying heat to the system for desorption; and the $H_2$ recovery will be very high (only $H_2$ loss is void gas, 99%+recovery).

The data presented in Table 2 reflect the regeneration capacity of various adsorbents following CO and $H_2$ adsorption by simple evacuation. The final column in Table 2 gives the ratio of CO capacity following 150° C. regeneration and CO capacity after CO and $H_2$ adsorption and evacuation at $10^{-1}$ torr for 2 hours. Those ratios in Table 2 are plotted as a function of heat of CO adsorption in FIG. 1. As can be seen, at low heats of CO adsorption, the ratio of K1/K2 is essentially unity indicating that the CO laden adsorbent can be fully regenerated by simple evacuation (no heating or purging). However, once the heat of adsorption is in excess of 15 kcal/mole, the capacity of the material after evacuation is about 25% less than the capacity after regeneration at 150° C.

TABLE 2

| Adsorbent | (mole/g/atm) K H CO | (kcal/mole) q CO | (mmole/g/atm) K H H2 | (kcal/mole) q H2 | (mmole/g/atm) K H CO after H2 | KCO(2)/ KCO(1) |
|---|---|---|---|---|---|---|
| AgLiX | 375 | 43.1 | 11.1 | 13.7 | 1.5 | 0.004 |
| CaX | 32 | 9.2 | 0.025 | 2.8 | 31 | 0.97 |
| 13X | 0.48 | 5.6 | 0.016 | 1.8 | 0.48 | 1.0 |
| Pd/Pt alumina | 53 | 34.9 | 1.6 | 11.8 | 1.8 | 0.03 |
| CuCl/ Alumina | 6.4 | 7.2 | 0.0031 | 2.2 | 6.3 | 0.98 |
| CuCl/ Zeolite | 33 | 13.3 | 0.035 | 3.0 | 24 | 0.82 |
| Ni/alumina | 1015 | 31.2 | 78 | 11.9 | 107 | 0.11 |

The results in Table 2 show that the Ag, non-Ag noble metal, and nickel-based materials all have high heats of CO adsorption and high initial capacity. However, after the material has been exposed to high pressure $H_2$, the CO capacity is greatly reduced. The Ag, Ni and non-Ag noble metal-based materials only show 0.4%, 11% and 3% of their original CO capacity after $H_2$ exposure (final column in table). This result shows that those adsorbents with the highest CO capacity and heat of adsorption are not preferred in this application. Both the 13X and CaX materials show their CO capacity is unaffected by the presence of $H_2$, but the 13X material has a low CO capacity. The CuCl/alumina material shows a CO capacity unaffected by CO, but the CO capacity is low. On the other hand, the CuCl/zeolite adsorbent lost 18% of its original capacity after $H_2$ exposure owing to its high heat of CO adsorption.

The Ni/alumina sample showed high CO capacity even in the presence of $H_2$. However, in the case of the Ni/alumina material, some of the CO in the gas stream was being reacted with $H_2$ to form $CH_4$ and water ($CO+3H_2=CH_4+H_2O$). Therefore, the Ni-based material was removing part of the CO in the feed gas by reaction to form $CH_4$. In the production of high purity $H_2$ it is not desired to add other impurities into the clean $H_2$ stream. Thus, materials that chemisorb $H_2$ and CO are undesirable.

Heats of CO Adsorption

In a preferred embodiment of the current invention, it is desired that the trace impurity removal vessel be regenerated quickly and easily by simple evacuation to a low absolute pressure (e.g., pressures of between around 0.00001 bar to The results in FIG. 1 show that low heats of CO adsorption are required for rapid adsorbent reactivation by simple evacuation.

The same type of plot can be constructed as a function of heat of adsorption of $H_2$. As can be seen in FIG. 2, as the heat of $H_2$ adsorption increases, the CO reversibility decreases. At a heat of adsorption of 5 kcal/gmole, the CO reversibility is about 75%. Heats of adsorption greater than 5 kcal/gmole should be avoided.

Example 2

$N_2$ Capacity and $N_2/H_2$ Selectivity

In the experiments of this example, the adsorbents used in the experiments of Example 1 were tested for $N_2$ adsorption.

In some instances, it may be desired to produce $H_2$ that is free of any impurities. If the synthesis gas used to produce the $H_2$ is formed by the steam reforming of methane, then the weakest adsorbing component in the feed mixture to the PSA purification equipment is $N_2$. Therefore, a $N_2$ removal material is required. Trace $N_2$ removal is typically accomplished by use of reactive media. For example, it is well known that titanium can react at elevated temperatures with $N_2$ to form titanium nitride. Other metals can also react with $N_2$ including Li, Mg and Zr.

Physical adsorbents were used for trace $N_2$ removal. Even though the capacity of physical adsorbents is much less than chemical adsorbents, the reversible nature of the process (adsorbents are regenerable), the ability to regenerate quickly, and lack of side chemical reactions are desired properties.

Table 3 gives the Henry's law constants for $N_2$ adsorption at 30° C. and the heats of $N_2$ adsorption on the adsorbents tested in the experiments of Example 1.

TABLE 3

| Adsorbent | (mmole/g/atm) K H $N_2$ @ 30° C. | (kcal/mole) q $N_2$ | S $N_2/H_2$ @ 30° C. |
|---|---|---|---|
| AgLiX | 3.5 | 7.2 | 0.31 |
| CaX | 3.1 | 6.7 | 124 |
| 13X | 0.20 | 4.3 | 12.5 |
| Pd/Pt alumina | 0.0073 | 2.1 | 0.0046 |
| CuCl/alumina | 0.011 | 2.2 | 3.5 |
| CuCl/zeolite | 0.12 | 3.9 | 3.4 |
| Ni/alumina | 0.0051 | 2.0 | 0.000064 |

In all cases, the $N_2$ isotherms were totally reversible by evacuation at $10^{-1}$ torr for 2 hours at 30° C. This shows that in all cases the $N_2$ is physically adsorbed. The AgLiX, Pd/Pt alumina, and Ni/alumina materials all show selectivity for $H_2$ over $N_2$ and are not useful for the application. The 13X, CuCl/alumina and CuCl/zeolite materials all show $N_2$ capacities too low to be of interest. Only the CaX material shows reasonable $N_2$ capacity and $N_2/H_2$ selectivity.

Example 3

AgLiX CO Capacity

CO breakthrough curves were measured on AgLiX at 25° C. and 150 psig. The feed gas contained 500 ppm CO in He, the total adsorbent weight was 33 grams and the flow rate was 1.8 standard liters per minute. Prior to breakthrough measurements, the material was regenerated in He at 150° C. and repressurized with He to 150 psig. From integration of the breakthrough curves, the CO capacity of the material was determined to be 0.53 mmole/g (1.5 wt %). That is a significant capacity given the low inlet pressure of CO in the experiment.

Example 4

Low Heat of $H_2$ Adsorption

A breakthrough was measured as described in Example 3, except that the feed gas was 500 ppm CO in $H_2$. Prior to the experiments, the AgLiX was repressurized in $H_2$ to 150 psig. From integration of the breakthrough curve, the CO capacity was determined to be 0.042 mmole/g (0.12 wt %). This result shows that the CO capacity of the AgLiX is affected substantially by the carrier gas. Since $H_2$ is chemisorbed by the material, the CO capacity in the presence of $H_2$ is significantly lower than that when He is the carrier gas. This indicates that adsorbents used in the invention should have a low heat of $H_2$ adsorption.

Example 5

CaX Adsorbent CO Capacity

CO breakthrough curves were also measured on CaX (CECA G586) at the conditions described in Example 4. The CO capacity as determined by integration of the breakthrough curve was 0.20 mmole/g (0.56 wt %). This is over four-times higher than that obtained with AgLiX from $H_2$ carrier gas, despite the fact that the heat of CO adsorption was almost five times higher on AgLiX.

Example 5A

CaLSX Adsorbent CO Capacity

CO breakthrough curves were also measured on CaLSX (CECA G5L86) at the conditions described in Example 4. The LSX material has a Si/Al ratio of 1.0 vs 1.2 for G586. The CO capacity as determined by integration of the breakthrough curve was 0.25 mmole/g (0.70 wt %). This shows that the LSX form of CaX adsorbs more CO owing to its lower Si/Al ratio and higher cation content than standard X zeolite.

Example 5B

CaLSX Adsorbent CO Capacity in He Carrier

CO breakthroughs were also measured on CaLSX (CECA G5L86) at the conditions described in Example 5A, but the carrier gas was changed from $H_2$ to He. The CO capacity as determined by integration of the breakthrough curve was 0.29 mmole/g (0.81 wt %). This result shows that the current process to purify high purity $H_2$ can also be used to purify high purity He.

Example 6

CaX Adsorbent CO Capacity Recovery

Following the experiment described in Example 5, the CaX sample was evacuated for 2 hours at 0.1 torr and the breakthrough curve was re-run. The measured breakthrough capacity at the conditions described above was 0.21 mmole/g, essentially the same as in Example 5. This result shows that only simple evacuation for a 2 hour period is sufficient to recover the CO capacity of the CaX adsorbent.

Example 7

Bed Size Required for Impurity Removal

The CO capacity following $H_2$ adsorption and evacuation is given in Table 1 (next to the last column). FIG. 3 shows a plot of relative CO capacity versus heat of CO adsorption, normalized to the CO capacity of CaX=1. The results with Ni/alumina are not contained in this plot, since the CO capacity obtained was actually a mixture of adsorption and reaction (to form water and methane). From FIG. 3, it is clear that the preferred materials from the bed size perspective have heats of CO adsorption from about 8 to 15 kcal/mole. If the heats are below 8 kcal/mole, the CO capacity is too low and above 15 kcal/mole, the CO becomes difficult to desorb.

Example 8

TSA and VSA Regeneration

In processes of the invention, $H_2$ impurities (CO, $CH_4$, $N_2$) are adsorbed physically; adsorbents can be regenerated quickly with low loss of product $H_2$ (high $H_2$ recovery). Typically, for trace impurity removal, temperature swing adsorption (TSA) is the preferred process cycle. That is primarily because TSA's typically yield higher pure gas recovery than pressure swing adsorption (PSA) or vacuum swing adsorption (VSA) systems. Table 4 below compares TSA and VSA processes for trace CO removal from $H_2$ using CaX (G586) as the adsorbent. The feed pressure is 800 psig, the CO impurity level is 10 ppm, the feed temperature is 25° C. and the bed volume is 3 $ft^3$.

TABLE 4

| Cycle | Gas processed | Regeneration Temperature | Regeneration Pressure | Regeneration Time | Regeneration Flow | Heater size | $H_2$ recovery |
|---|---|---|---|---|---|---|---|
| TSA | 125,000 SCF | 100° C. | 1.5 bara | 16 hours | 8000 SCF | 0.6 kw | 93.6% |
| VSA | 125,000 SCF | 25° C. | 0.001 bara | 4 hours | 120 SCF | 0 | 99.9% |

The results in Table 4 show that for the VSA process, the regeneration time is shorter, the regeneration flow is less and the $H_2$ recovery is higher. In addition, the VSA system 5 does not require any equipment or insulation for heating and cooling the vessel.

Example 9

TSA and VSA Regeneration $N_2$ removal from a $H_2$ gas stream was determined in an experiment designed in 10 accordance with Example 8. The feed pressure, temperature, bed size and CaX adsorbent were the same as described in Example 8 and the $N_2$ impurity level was 500 ppm. Table 5 below compares the process performance of a TSA vs a VSA.

TABLE 5

| Cycle | Gas processed | Regeneration Temperature | Regeneration Pressure | Regeneration Time | Regeneration Flow | Heater size | $H_2$ recovery |
|---|---|---|---|---|---|---|---|
| TSA | 12,000 SCF | 100° C. | 1.5 bara | 16 hours | 8000 SCF | 0.6 kw | 33.3% |
| VSA | 12,000 SCF | 25° C. | 0.001 bara | 4 hours | 50 SCF | 0 | 99.6% |

The vessel processed much less gas to $N_2$ removal versus CO removal since $N_2$ was more weakly adsorbed. The $H_2$ recovery for the VSA system remained at over 99%, while the TSA recovery was only 33%. These results show the advantage of using physical adsorbents with a vacuum regeneration process.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A process for generating an essentially carbon monoxide-free hydrogen gas stream, the process comprising:
   (a) (i) feeding a high-purity hydrogen gas feed stream for around 30 minutes or more through a first of two adsorbers that are fluidly connected in parallel or in series and that are each packed with an adsorbent consisting of a zeolite which is cation exchanged with a metal other than a transition metal and which contains less than about 0.5% by weight of a transition metal, and (ii) recovering a first essentially carbon monoxide-free hydrogen gas stream from the first adsorber;
   (b) thereafter purging the first adsorber by (1) depressurizing it to less than atmospheric pressure, and by (2) (i) recycling a portion of the first essentially carbon monoxide-free hydrogen gas stream through the first adsorber, and/or (ii) feeding an inert gas stream through the first adsorber; and
   (c) as the first adsorber is purged, feeding a second portion of the high-purity hydrogen gas feed stream for around 30 minutes or more through the second of the two adsorbers and recovering a second essentially carbon monoxide-free hydrogen gas stream from the second adsorber.

2. The process of claim 1, wherein:
   (a) the adsorbent has a heat of hydrogen adsorption of less than about 5 kcal/mole, a heat of carbon monoxide adsorption of between about 8 to about 12 kcal/mole, and a heat of nitrogen adsorption of greater than about 5 kcal/mole; and
   (b) the high-purity hydrogen gas feed streams are fed to the first and second adsorbers at a pressure of between about 30 to about 1,000 bar.

3. The process of claim 1, wherein the zeolite is selected from the group consisting of zeolites A, low silica X (LSX), X, Y, mordenite, chabazite, erionite, offretite, and clinoptilite.

4. The process of claim 1, wherein at least one of the two adsorbers is also packed with one or more of the following: carbon, alumina, silica gel, or a zeolite which is not cation exchanged.

5. The process of claim 1, wherein the two adsorbers are packed with adsorbent particles having a particle size of between about 0.5 mm to about 5 mm.

6. The process of claim 5, wherein the adsorbent particles are selected from the group consisting of CaLSX and CaX.

7. The process of claim 1, wherein:
   (a) the two adsorbers are packed with adsorbent particles selected from the group consisting of CaLSX and CaX;
   (b) the adsorbent particles (i) have a particle size of between about 0.5 mm to about 5 mm and (ii) a heat of hydrogen adsorption of less than about 5 kcal/mole, a heat of carbon monoxide adsorption of between about 8 to about 12 kcal/mole, and a heat of nitrogen adsorption of greater than about 5 kcal/mole;
   (c) the first adsorber is purged by depressurizing it to around 0.00001 bar to around 0.5 bar; and
   (d) an essentially carbon monoxide-free hydrogen gas stream is recovered from the two adsorbers.

8. The process of claim 1, further comprising feeding either or both of the first and second essentially carbon monoxide-free hydrogen gas streams to a hydrogen distribution system.

9. The process of claim 8, wherein the hydrogen distribution system includes a hydrogen fuel station for vehicles.

10. The process of claim 1, wherein the first and second essentially carbon monoxide-free hydrogen gas streams contain around 500 ppm methane and around 1,000 ppm nitrogen.

11. The process of claim 1, wherein the first and second essentially carbon monoxide-free hydrogen gas streams contain around 1 to 10 ppb of total impurities.

12. The process of claim 1, wherein the first and second essentially carbon monoxide-free hydrogen gas streams contain around 100 ppb to around 1,000 ppm of nitrogen.

13. The process of claim 12, wherein the first and second essentially carbon monoxide-free hydrogen gas streams contain around 500 ppm or less of methane.

14. A process for generating an essentially carbon monoxide-free hydrogen gas stream, the process comprising:
(a) (i) feeding a high-purity hydrogen gas feed stream for around 30 minutes or more through an adsorber that is packed with an adsorbent consisting of a zeolite which is cation exchanged with a metal other than a transition metal and which contains less than about 0.5% by weight of a transition metal, and (ii) recovering an essentially carbon monoxide-free hydrogen gas stream from the adsorber; and
(b) thereafter purging the adsorber by (1) depressurizing it to less than atmospheric pressure, and by (2) (i) recycling a portion of the essentially carbon monoxide-free hydrogen gas stream through the adsorber, and/or (ii) feeding an inert gas stream through the first adsorber.

15. The process of claim 14, wherein:
(a) the adsorbent has a heat of hydrogen adsorption of less than about 5 kcal/mole, a heat of carbon monoxide adsorption of between about 8 to about 12 kcal/mole, and a heat of nitrogen adsorption of greater than about 5 kcal/mole; and
(b) the high-purity hydrogen gas feed stream is fed to the first and second adsorber at a pressure of between about 30 to about 1,000 bar.

16. The process of claim 14, wherein the zeolite is selected from the group consisting of zeolites A, low silica X (LSX), X, Y, mordenite, chabazite, erionite, offretite, and clinoptilite.

17. The process of claim 14, wherein the adsorber is also packed with one or more of the following: carbon, alumina, silica gel, or a zeolite which is not cation exchanged.

18. The process of claim 14, wherein the adsorber is packed with adsorbent particles having a particle size of between about 0.5 mm to about 5 mm.

19. The process of claim 18, wherein the adsorbent particles are selected from the group consisting of CaLSX and CaX.

20. The process of claim 14, wherein:
(a) the adsorber is packed with adsorbent particles selected from the group consisting of CaLSX and CaX;
(b) the adsorbent particles (i) have a particle size of between about 0.5 mm to about 5 mm and (ii) a heat of hydrogen adsorption of less than about 5 kcal/mole, a heat of carbon monoxide adsorption of between about 8 to about 12 kcal/mole, and a heat of nitrogen adsorption of greater than about 5 kcal/mole;
(c) the adsorber is purged by depressurizing it to around 0.00001 bar to around 0.5 bar; and
(d) an essentially carbon monoxide-free hydrogen gas stream is recovered from the adsorber.

21. The process of claim 14, further comprising feeding the essentially carbon monoxide-free hydrogen gas stream to a hydrogen distribution system.

22. The process of claim 21, wherein the hydrogen distribution system includes a hydrogen fuel station for vehicles.

23. The process of claim 14, wherein the essentially carbon monoxide-free hydrogen gas stream contains around 500 ppm or less methane and around 1,000 ppm or less nitrogen.

24. The process of claim 14, wherein the essentially carbon monoxide-free hydrogen gas stream contains around 1 to 10 ppb of total impurities.

25. The process of claim 14, wherein the essentially carbon monoxide-free hydrogen gas stream contains around 100 ppb to around 1,000 ppm of nitrogen.

26. The process of claim 1, further comprising heating the adsorbent in the first and second adsorbers to a temperature of between about 250° C. to about 400° C. before feeding the high-purity hydrogen gas stream to the first or second adsorbers.

27. The process of claim 14, further comprising heating the adsorbent to a temperature of between about 250° C. to about 400° C. before feeding the high-purity hydrogen gas stream to the adsorber.

28. The process of claim 1, wherein the zeolite is in binderless form.

29. The process of claim 14, wherein the zeolite is in binderless form.

30. The process of claim 14, wherein the adsorber is purged at a pressure of between about 0.00001 bar to around 0.5 bar.

31. A process for generating an essentially carbon monoxide-free helium gas stream, the process comprising:
(a) (i) feeding a high-purity helium gas feed stream for around 30 minutes or more through a first of two adsorbers that are fluidly connected in parallel or in series and that are each packed with an adsorbent consisting of a zeolite which is cation exchanged with a metal other than a transition metal and which contains less than about 0.5% by weight of a transition metal, and (ii) recovering a first essentially carbon monoxide-free helium gas stream from the first adsorber;
(b) thereafter purging the first adsorber by (1) depressurizing it to less than atmospheric pressure, and by (2) (i) recycling a portion of the first essentially carbon monoxide-free helium gas stream through the first adsorber, and/or (ii) feeding an inert gas stream through the first adsorber; and
(c) as the first adsorber is purged, feeding a second portion of the high-purity helium gas feed stream for around 30 minutes or more through the second of the two adsorbers and recovering a second essentially carbon monoxide-free helium gas stream from the second adsorber.

32. The process of claim 31, wherein:
(a) the adsorbent has a heat of helium adsorption of less than about 5 kcal/mole, a heat of carbon monoxide adsorption of between about 8 to about 12 kcal/mole, and a heat of nitrogen adsorption of greater than about 5 kcal/mole; and
(b) the high-purity helium gas feed streams are fed to the first and second adsorbers at a pressure of between about 30 to about 1,000 bar.

33. The process of claim 31, wherein:
(a) the two adsorbers are packed with adsorbent particles selected from the group consisting of CaLSX and CaX;

(b) the adsorbent particles (i) have a particle size of between about 0.5 mm to about 5 mm and (ii) a heat of helium adsorption of less than about 5 kcal/mole, a heat of carbon monoxide adsorption of between about 8 to about 12 kcal/mole, and a heat of nitrogen adsorption of greater than about 5 kcal/mole;

(c) the first adsorber is purged by depressurizing it to around 0.00001 bar to around 0.5 bar; and (d) an essentially carbon monoxide-free helium gas stream is recovered from the two adsorbers.

34. The process for generating an essentially carbon monoxide-free helium gas stream, the process comprising:

(a) (i) feeding a high-purity helium gas feed stream for around 30 minutes or more through an adsorber that is packed with an adsorbent consisting of a zeolite which is cation exchanged with a metal other than a transition metal and which contains less than about 0.5% by weight of a transition metal, and (ii) recovering an essentially carbon monoxide-free helium gas stream from the adsorber; and (b) thereafter purging the adsorber by (1) depressurizing it to less than atmospheric pressure, and by (2) (i) recycling a portion of the essentially carbon monoxide-free helium gas stream through the adsorber, and/or (ii) feeding an inert gas stream through the first adsorber.

35. The process of claim 34, wherein:

(a) the adsorbent has a heat of helium adsorption of less than about 5 kcal/mole, a heat of carbon monoxide adsorption of between about 8 to about 12 kcal/mole, and a heat of nitrogen adsorption of greater than about 5 kcal/mole; and (b) the high-purity helium gas feed stream is fed to the first and second adsorber at a pressure of between about 30 to about 1,000 bar.

36. The process of claim 34, wherein:

(a) the adsorber is packed with adsorbent particles selected from the group consisting of CaLSX and CaX;

(b) the adsorbent particles (i) have a particle size of between about 0.5 mm to about 5 mm and (ii) a heat of helium adsorption of less than about 5 kcal/mole, a heat of carbon monoxide adsorption of between about 8 to about 12 kcal/mole, and a heat of nitrogen adsorption of greater than about 5 kcal/mole;

(c) the adsorber is purged by depressurizing it to around 0.00001 bar to around 0.5 bar; and (d) an essentially carbon monoxide-free helium gas stream is recovered from the adsorber.

* * * * *